Dec. 25, 1956 R. W. VON HERBULIS ET AL 2,775,422
COMBINATION HANGER AND CLAMP
Filed May 13, 1954
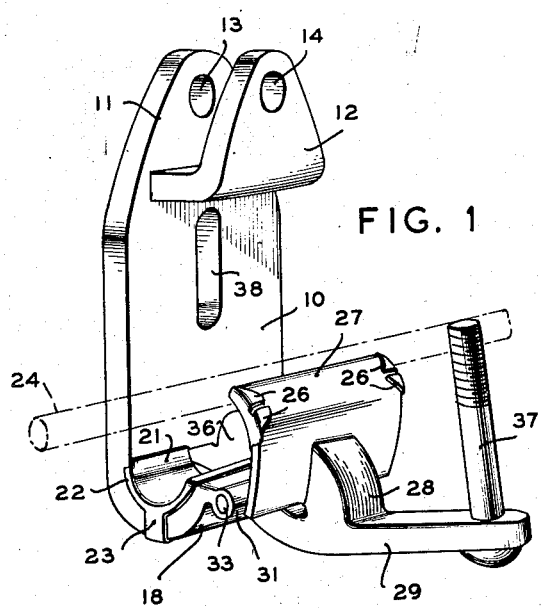
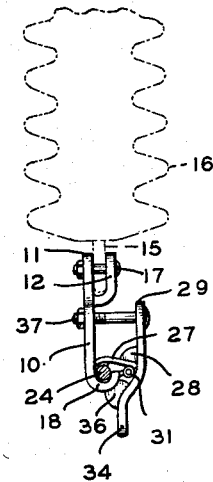
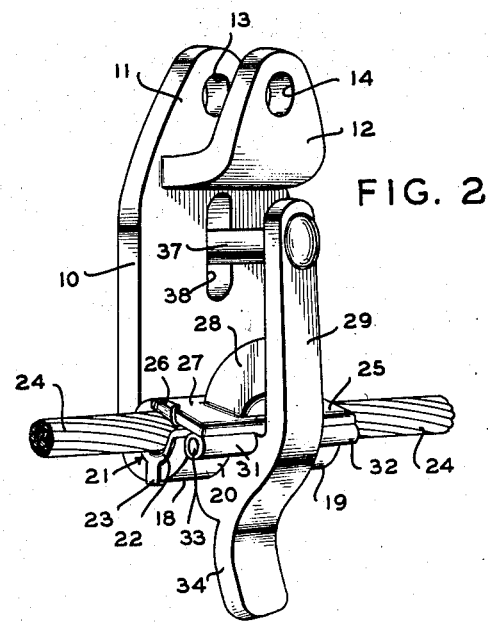
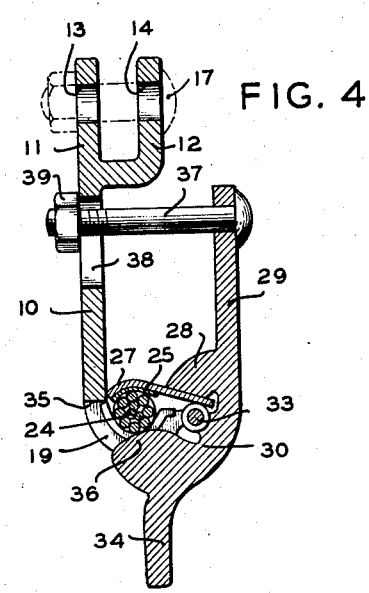
INVENTORS
CARL L. VON HERBULIS
ROBERT W. VON HERBULIS
BY *H. Yates Dowell*
ATTORNEY

United States Patent Office 2,775,422
Patented Dec. 25, 1956

2,775,422

COMBINATION HANGER AND CLAMP

Robert W. Von Herbulis and Carl L. Von Herbulis, Sanford, Fla.

Application May 13, 1954, Serial No. 429,505

4 Claims. (Cl. 248—63)

This invention relates to supports and more particularly to supports for cables and the like. Specifically, the invention relates to a combination hanger and clamp for supporting high voltage electric cables or conductors of electricity.

Heretofore, supports for high voltage electric conductors have not been satisfactory for a number of reasons including hazard to workmen, the need of two hands in installing with the attendant danger of the workmen falling or exposing themselves to electric energy on account of the completion of a circuit the probabilities of which were increased by the use of both hands, consuming excessive time, increasing labor and the degree of accuracy in installation, as well as subjecting the conductor or cable to injury from cuts, burns, or other cause.

Among the objects of the invention are to overcome the difficulties enumerated and to provide a relatively simple combination hanger and clamp to which a cable can be readily applied or removed and which clamp is automatically closed when the cable is applied and can be easily fastened in such closed position by only one hand of the operator, and which clamp can be easily opened and released from seated position by positive means.

It is a further object of the invention to provide a combination hanger and clamp in which time, labor, hazard, and care and accuracy of application are materially reduced, as well as a combination hanger and clamp which will not cut, burn, or otherwise damage the electric cable, and which, when the cable is placed in the clamp, the latter will close automatically, ready to be permanently secured in closed position by the mere addition of a nut.

It is a further object of the invention to provide a combination hanger and clamp by means of which a cable may be supported or an object supported from the cable.

Other objects and advantages of the invention will become apparent from the following description taken in conjunction with the accompanying drawing in which:

Fig. 1 is a perspective illustrating one form of the invention with the clamp open ready to receive the cable;

Fig. 2, a similar perspective with the clamp in closed position and with a cable or line supported;

Fig. 3, a side elevation of the structure of Fig. 2 with the device supported from an insulator; and Fig. 4, a vertical section through the invention.

Briefly stated, the invention comprises an elongated bar having spaced parallel members at one end adapted to receive between them the bar of an insulating support and with a bolt extending transversely through the same to provide fastening means therefor.

At the lower end the clamp is provided with a pair of spaced bearing portions providing a fixed jaw for securing a cable thereagainst. The movable jaw is located on an arm mounted centrally between the portions of said movable jaw by means of a hinge so that when the arm is swung the movable jaw is carried toward and from the fixed jaw.

The arm is also provided with a boss which extends between the spaced bearing portions forming the fixed jaw so that when a cable is applied, the boss is engaged to cause the arm to swing and bring the movable jaw into closed or clamping position. The arm has its lower end disposed in a position to engage the lower end of the hanger body so that it can only move to a position substantially at right angles to the body in order to open the clamp and said arm is provided on its upper portion with a stud so that when it is closed, the stud will extend through a slot in the hanger and can receive a nut on the rear side of the hanger to secure the removable jaw in clamped or closed position. The fixed and movable jaws are provided with suitable copper sleeve sections forming a lining.

With continued reference to the drawing, the combination hanger and clamp of the present invention comprises an elongated hanger 10 having spaced parallel ears 11 and 12 and aligned openings 13 and 14. The combination hanger and clamp is adapted to be supported on the depending bar 15 of an insulator 16 by means of a bolt 17 extended through the bar 15 and the openings 13 and 14.

The lower end portion of the hanger is provided with spaced curved socket or bearing providing portions 18 and 19, the outer end of the member 18 being flared or rounded to avoid sharp edges which might cause damage as will be hereinafter discussed and the end of the socket or bearing member 19 having an end of a similar configuration. Each of the socket or bearing portions 18 and 19 is provided with a lining or bearing section 21 of copper or other soft metal and having end flanges 22 and securing tabs 23, one at each end of the same. The socket or bearing portions 18 and 19 form lower clamping jaws in which are received an electric cable 24 and which is adapted to be clamped by a pivoted jaw having a cooperating lining or bearing section 25 having tabs 26 at each end which embrace a curved jaw or clamping member 27 carried by a supporting bracket 28 on an arm 29, having a sleeve 30 located in alignment with a pair of sleeves 31 and 32 on the outer up-turned ends of the socket or bearing portions 18 and 19 and in which sleeve is mounted a hinge pin 33 so that the arm can thus move about the pin 33 as a pivot.

The arm is provided at its lower end with an extension forming a stop portion 34 which engages the lower edge or end 35 of the wall of the hanger 10 between the socket or bearing portions 18 and 19 to limit rotation of the arm 29 so that it only can move to substantially horizontal position at right angles to the hanger 10 with the copper sleeves 21 and 25 in operative relation to permit insertion of cable 24 as shown particularly in Fig. 1. The arm 29 is provided with a boss 36 so that when the cable 24 is applied and comes in contact with such boss, the arm 29 will be swung on its pivot to produce closing action.

In order to secure the parts in fixed relation, a bolt or stud 37 may be fixed or removably secured in the upper end of the arm 29, and when the parts are closed the bolt will extend through a slot 38 in the body 10 and by use of a nut 39, the parts can be fastened in fixed position and only one hand of the operator is required to apply nut 39.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A combination hanger and clamp for supporting a high voltage electric cable from a high voltage insulator comprising an elongated hanger body, means to secure one end of the hanger body to the insulator, a hook formed in the other end portion of said body providing a hook socket portion, a lever pivotally mounted on an axis adjacent the extremity of the hook socket portion, said lever having a laterally extending boss adapted to move in a path across the hook socket portion, a cooperating stop means on said lever and body for limiting the pivotal movement beyond a predetermined angle with respect to said body, a clamping jaw on said lever and having portions extending over said hook socket portion when said jaw is in clamping position, said boss being out of the cable receiving portion of the hook socket portion when the lever is pivoted to position said jaw in clamping relation to said hook socket, cooperating means on said lever and said body when said jaw is in clamping position for maintaining said jaw in clamping relation to said socket.

2. A combination hanger and clamp for supporting a high voltage electric cable from a high voltage insulator comprising an elongated hanger body, means to secure one end of the hanger body to the insulator, a hook formed in the other end of said body providing laterally spaced hook socket portions, a lever pivotally mounted between said hook socket portions on an axis adjacent the free extremity of the hook socket portions, said lever having a laterally extending boss adapted to move in a path between the said hook socket portions, stop means on said lever for preventing said lever from privoting beyond a predetermined angle to the body, a clamping jaw on said lever and having portions extending over said hook socket portions when said jaw is in clamping position, said boss being out of the cable receiving portion of the hook socket portions when the lever is in clamping position with respect to the body, a bolt fixed on said lever and projecting through said body when said jaw is in closed position, said body having a slot through which the bolt may project whereby a nut can be applied to the bolt with one hand.

3. A combination hanger and clamp for supporting a high voltage electric cable from a high voltage insulator comprising an elongated hanger body, bifurcated means to secure one end of the hanger body to the insulator, a hook formed in the other end of said body and having laterally spaced hook socket portions, a lever pivotally mounted between said hook socket portions on an axis adjacent the free extremity of the hook socket portions, said lever having a laterally extending boss adapted to move in a path between the said hook socket portions above said socket portions for contact by a cable to be supported, stop means on said lever for preventing said lever from pivoting beyond approximately right angles to the body, a jaw fixed on said lever at approximately right angles to said lever and having portions adapted to extend over said hook socket portions and clamp a cable between said jaw and hook socket portions when said jaw is in closed position, said boss being out of the cable receiving portion of the hook socket portions when the jaw is in clamping position, a bolt fixed on said lever and projecting through said body when said jaw is in closed position, said body having a slot through which the bolt may project whereby a nut can be applied to the bolt with one hand or a tool carried thereby and a line can be placed in the hanger with one hand or a tool carried thereby.

4. The invention according to claim 3 in which the outer ends of the socket portions and jaws are flared and cable contacting shims are mounted on the socket portions and the clamping jaw.

References Cited in the file of this patent

UNITED STATES PATENTS

| | | |
|---|---|---|
| 572,770 | Putnam | Dec. 8, 1896 |
| 1,699,781 | Ellis | Jan. 22, 1929 |
| 1,735,192 | Williams | Nov. 12, 1929 |
| 1,776,531 | Woodruff | Sept. 23, 1930 |
| 2,058,558 | Bovard | Oct. 27, 1936 |
| 2,522,951 | Knox | Sept. 19, 1950 |

FOREIGN PATENTS

| | | |
|---|---|---|
| 588,355 | France | of 1925 |